United States Patent
Kang et al.

(10) Patent No.: US 10,014,969 B2
(45) Date of Patent: Jul. 3, 2018

(54) METHOD AND APPARATUS FOR REMOVING INTERFERENCE BY USING NETWORK IN DOWNLINK TRANSMISSION OF CELLULAR COMMUNICATION SYSTEM USING ORTHOGONAL FREQUENCY DIVISION MULTIPLEXING METHOD

(71) Applicant: Samsung Electronics Co., Ltd., Gyeonggi-do (KR)

(72) Inventors: Jeewoong Kang, Seoul (KR); Sungkwon Jo, Gyeonggi-do (KR); Seunghyeon Nahm, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/537,035

(22) PCT Filed: Dec. 15, 2015

(86) PCT No.: PCT/KR2015/013699
§ 371 (c)(1),
(2) Date: Jun. 16, 2017

(87) PCT Pub. No.: WO2016/099106
PCT Pub. Date: Jun. 23, 2016

(65) Prior Publication Data
US 2017/0366289 A1    Dec. 21, 2017

(30) Foreign Application Priority Data
Dec. 18, 2014    (KR) .................. 10-2014-0183480

(51) Int. Cl.
*H04B 1/00*        (2006.01)
*H04J 11/00*       (2006.01)
*H04W 72/04*       (2009.01)

(52) U.S. Cl.
CPC ......... *H04J 11/005* (2013.01); *H04W 72/042* (2013.01); *H04J 2011/0009* (2013.01); *H04J 2011/0096* (2013.01)

(58) Field of Classification Search
None
See application file for complete search history.

(56) References Cited

U.S. PATENT DOCUMENTS

| | | |
|---|---|---|
| 2007/0206688 A1 | 9/2007 | Munzner |
| 2008/0080629 A1 | 4/2008 | Munzner |

(Continued)

FOREIGN PATENT DOCUMENTS

| | | | |
|---|---|---|---|
| JP | 2010206457 | 9/2010 | |
| WO | WO 2013/068832 | 5/2013 | |
| WO | WO 2013068832 A1 * | 5/2013 | .......... H04W 72/082 |

OTHER PUBLICATIONS

PCT/ISA/210 Search Report issued on PCT/KR2015/013699 (pp. 3).
PCT/ISA/237 Written Opinion issued on PCT/KR2015/013699 (pp. 6).

*Primary Examiner* — Mohammed Rachedine
(74) *Attorney, Agent, or Firm* — The Farrell Law Firm, P.C.

(57) ABSTRACT

The present invention presents a method by which a base station notifies a terminal of information on a tone into which interference caused by surrounding cells greatly flows, and by which a terminal uses the information so as to efficiently remove the interference caused by the surrounding cells and to demodulate data channels, such that the method improves reception performance. Particularly, when the surrounding cells transmit cell-specific reference signals, the base station transmits, to the terminal, location information of the cell-specific reference signals transmitted by the surrounding cells, and the terminal demodulates the received (Continued)

data except for a data channel tone in which cell-specific reference signals of the surrounding cells greatly cause interference. The present invention can improve data reception performance by efficiently removing the interference caused by the surrounding cells.

18 Claims, 12 Drawing Sheets

(56) References Cited

U.S. PATENT DOCUMENTS

| | | |
|---|---|---|
| 2008/0227422 A1 | 9/2008 | Hwang et al. |
| 2010/0002643 A1 | 1/2010 | Han et al. |
| 2012/0027109 A1 | 2/2012 | Ancora et al. |
| 2012/0069756 A1 | 3/2012 | Ji et al. |
| 2013/0022096 A1 | 1/2013 | Kazmi et al. |
| 2013/0114434 A1 | 5/2013 | Muruganathan et al. |
| 2013/0115986 A1 | 5/2013 | Mueck et al. |
| 2013/0122848 A1 | 5/2013 | Dehner et al. |
| 2013/0244709 A1 | 9/2013 | Davydov et al. |
| 2013/0315191 A1 | 11/2013 | Yoshimoto et al. |
| 2014/0023001 A1 | 1/2014 | Huang et al. |
| 2014/0301272 A1 | 10/2014 | Vajapeyam et al. |
| 2015/0189630 A1* | 7/2015 | Aiba .................... H04W 72/042 370/329 |
| 2016/0029395 A1* | 1/2016 | Kim ....................... H04J 11/004 370/329 |
| 2016/0099790 A1* | 4/2016 | Balachandran ........... H04L 1/00 370/329 |
| 2016/0165616 A1* | 6/2016 | Ohwatari ............ H04W 72/082 370/329 |
| 2016/0173217 A1* | 6/2016 | Sano .................... H04W 72/082 370/329 |
| 2017/0013636 A1* | 1/2017 | Wang ................... H04J 11/0053 |

* cited by examiner

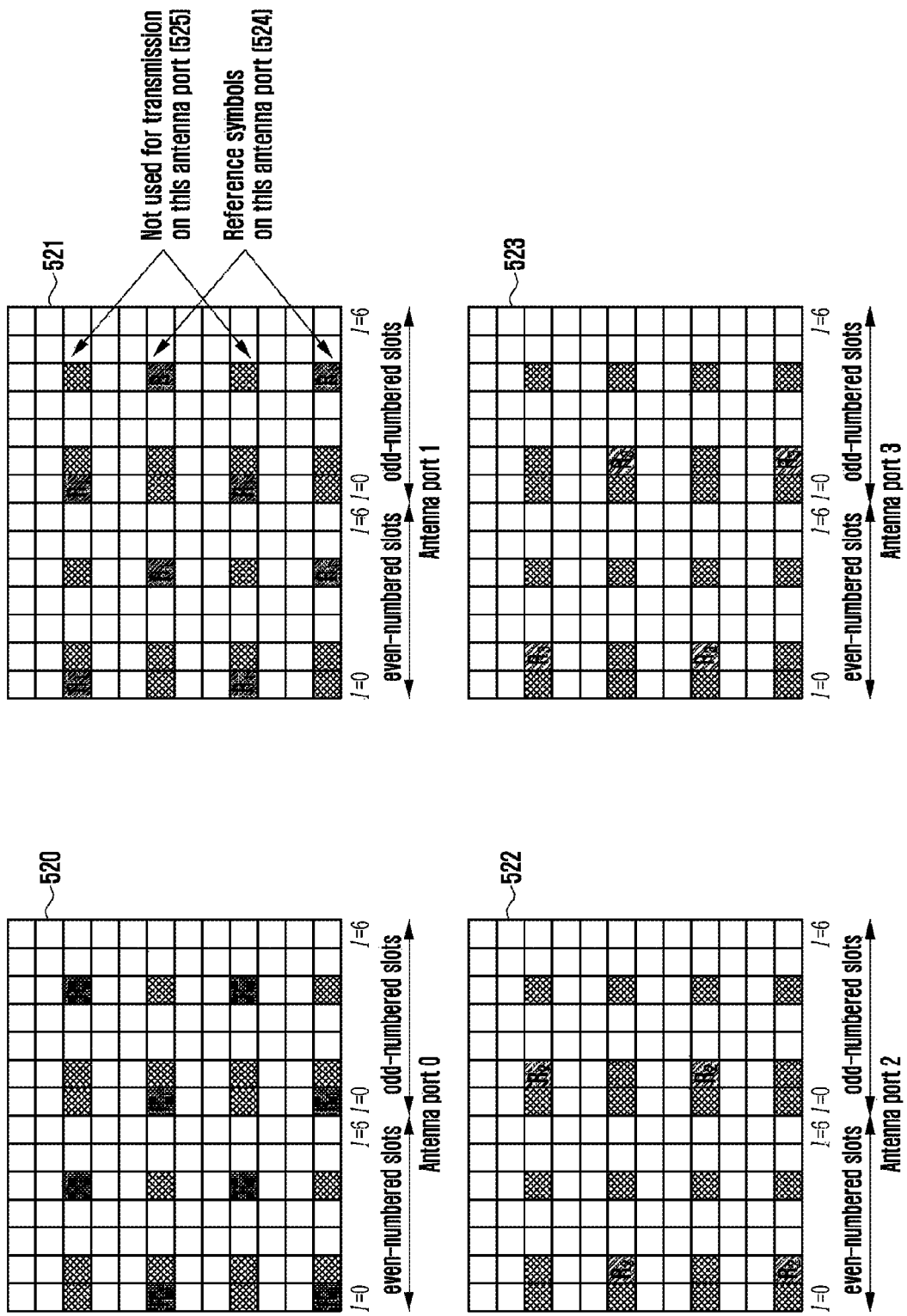

METHOD AND APPARATUS FOR REMOVING INTERFERENCE BY USING NETWORK IN DOWNLINK TRANSMISSION OF CELLULAR COMMUNICATION SYSTEM USING ORTHOGONAL FREQUENCY DIVISION MULTIPLEXING METHOD

PRIORITY

This application is a National Phase Entry of PCT International Application No. PCT/KR2015/013699 which was filed on Dec. 15, 2015, and claims priority to Korean Patent Application No. 10-2014-0183480, which was filed on Dec. 18, 2014, the contents of each of which are incorporated herein by reference.

TECHNICAL FIELD

The present invention relates to an Orthogonal Frequency Division Multiplexing (OFDM) wireless communication system and, in particular, to a network-assisted interference cancellation method and device

BACKGROUND ART

OFDM is a method of encoding data on multiple carriers that are mutually orthogonal for enhancement in frequency utilization efficiency and robustness to frequency-selective fading channels. It is also advantageous for achieving fast modulation/demodulation at the transmission/reception node using Inverse Fast Fourier Transform (IFFT) and Fast Fourier Transform (FFT). Such features of OFDM are suitable for high-speed data transmission; thus, they are adopted as a standard transmission scheme for 3rd Generation Partnership Project (3GPP) Long-Term Evolution (LTE) and Institute of Electrical and Electronics Engineers (IEEE) 802.11 and 802.16.

In a downlink of an OFDM-based cellular communication system, a Reference Signal (RS) for use in channel estimation and a data channel carrying information destined for a terminal are mapped to a tone corresponding to a subcarrier and an OFDM symbol according to a system specific rule for transmission. A terminal, to acquire the information transmitted thereto, estimates channel response based on the RS and performs demodulation on the data channel received based on the estimated channel response.

DISCLOSURE OF INVENTION

Technical Problem

Although it is typical for the terminal to perform demodulation on all of the data channels for transmitting the information, if a specific data channel tone is dominantly impacted by interference from neighboring cells, it may be preferable, in view of efficiency, to perform demodulation with the exception of the corresponding tone. However, it is difficult for a terminal to autonomously identify the data channel tone that is dominantly impacted by interference. The present invention proposes a method for improving the reception performance in such a way that a base station notifies a terminal of the information on the tone dominantly impacted by neighboring cell interference in order for the terminal to cancel the neighboring cell interference and to perform demodulation on the data channel more efficiently.

Solution to Problem

In accordance with an aspect of the present invention, a method for transmitting interference cancellation information from a base station to a terminal in an Orthogonal Frequency Division Multiplexing (OFDM) wireless communication system includes collecting, at the base station, information on a neighboring cell causing interference equal to or greater than a predetermined threshold to the terminal, generating the interference cancellation information for use in data channel demodulation of the terminal based on the neighboring cell information, and transmitting the interference cancellation information to the terminal.

In accordance with another aspect of the present invention, a method for a terminal to demodulate a data channel based on interference cancellation information received from a base station in an Orthogonal Frequency Division Multiplexing (OFDM) wireless communication system includes receiving the interference cancellation information generated based on information on a neighboring cell causing interference equal to or greater than a predetermined threshold to the terminal for use in data channel demodulation of the terminal, receiving the data channel from the base station, and demodulating the data channel based on the interference cancellation information.

In accordance with another aspect of the present invention, a base station for transmitting interference cancellation information to a terminal in an Orthogonal Frequency Division Multiplexing (OFDM) wireless communication system includes a transceiver which transmits/receives signals and a controller which controls to collect information on a neighboring cell causing interference equal to or greater than a predetermined threshold to the terminal, to generate the interference cancellation information for use in data channel demodulation of the terminal based on the neighboring cell information, and to transmit the interference cancellation information to the terminal.

In accordance with still another aspect of the present invention, a terminal for demodulating a data channel based on interference cancellation information received from a base station in an Orthogonal Frequency Division Multiplexing (OFDM) wireless communication system includes a transceiver which transmits/receives signals and a controller which controls to receive the interference cancellation information generated based on information on a neighboring cell causing interference equal to or greater than a predetermined threshold to the terminal for use in data channel demodulation of the terminal, to receive the data channel from the base station, and to demodulate the data channel based on the interference cancellation information.

Advantageous Effects of Invention

The network-assisted data channel interference cancellation method and device of the present invention is advantageous in terms of improving data reception performance by efficiently canceling the interference caused by neighboring cells.

BRIEF DESCRIPTION OF DRAWINGS

FIG. 5C is a diagram illustrating a CRS pattern in an exemplary case of using 4 CRS antennas in the LTE system;

MODE FOR THE INVENTION

Figure 1:
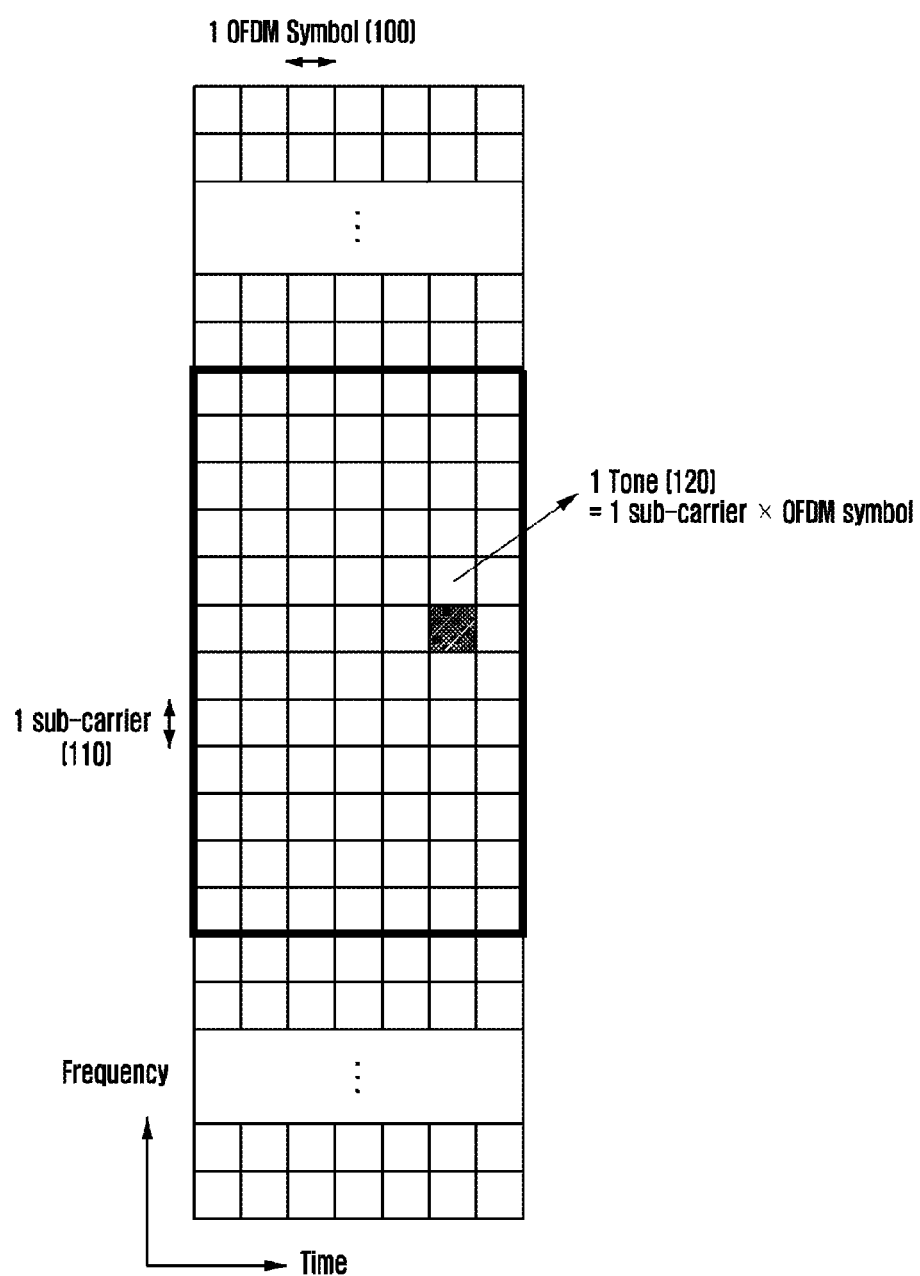
FIG. 1 is a diagram illustrating a resource structure of an OFDM system.

Exemplary embodiments of the present invention are described with reference to the accompanying drawings in detail. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Although the description is directed to the OFDM-based radio communication system, particularly the 3GPP LTE and LTE-Advanced (LTE-A), it will be understood by those skilled in the art that the present invention can be applied also to other communication systems having a similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

FIG. 1 is a diagram illustrating a resource structure of an OFDM system.

In reference to FIG. 1, the resources of an OFDM system are described by a resource grid of subcarriers and OFDM symbols. A subcarrier 110 is a basic resource unit in the frequency domain and an OFDM symbol 100 is a basic time resource unit in the OFDM resource grid. A tone 120 corresponds to one subcarrier and one OFDM symbol, and the transmitter maps signals necessary for data communication to the tones.

The signals necessary for data communication may be categorized into two categories: reference signal carrying a predetermined sequence for estimating channel response characteristics and data channel carrying information destined to a terminal. The reference signal and data channel are mapped to the resource grid according to an OFDM system-specific rule. In such an OFDM resource structure, a receiver estimates a channel response based on the reference signal and demodulates the data channel based on the estimated channel response to acquire the information.

Figure 2:
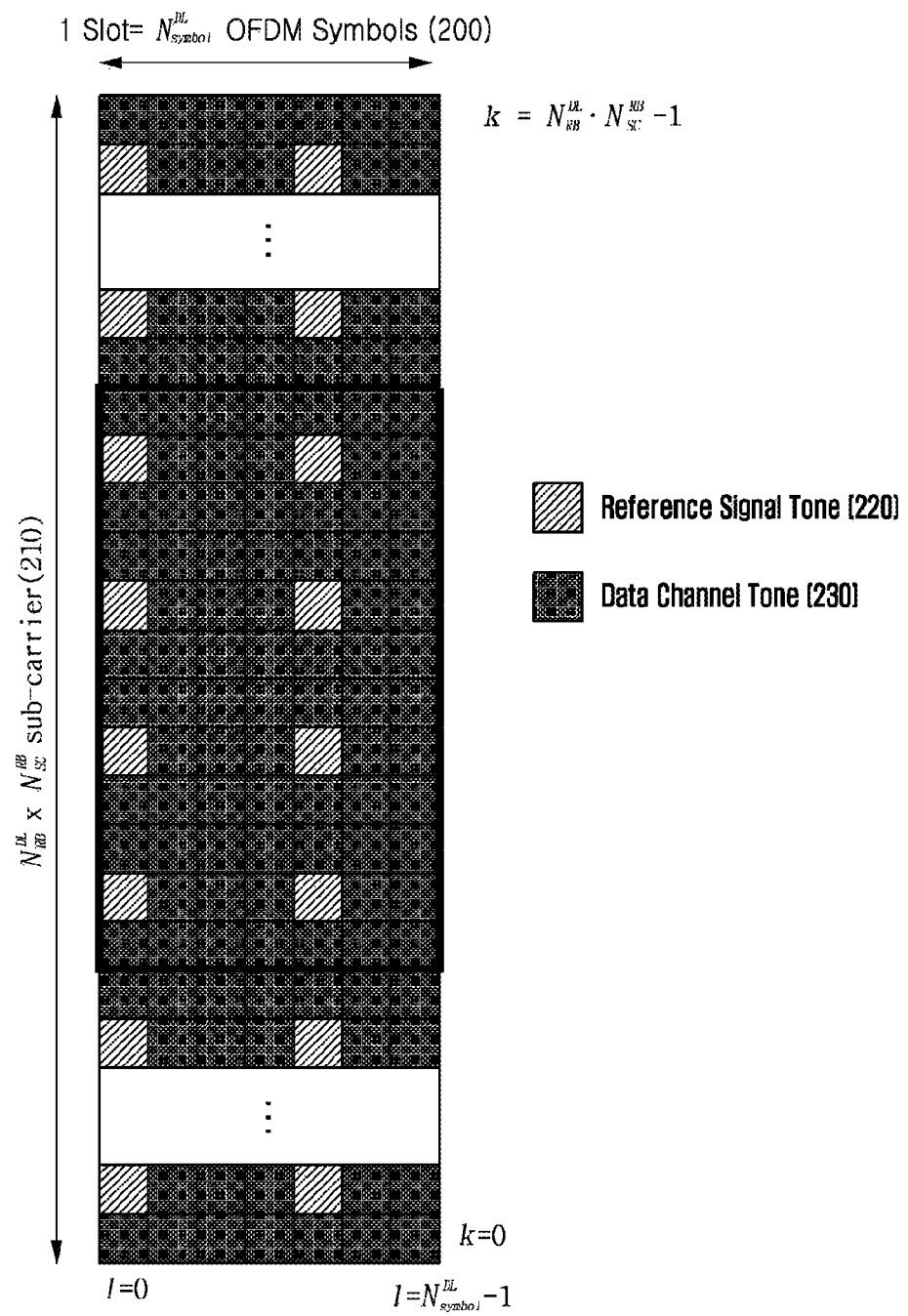
FIG. 2 is a diagram illustrating a downlink resource structure of an LTE system as one of the representative OFDM systems.

FIG. 2 is a diagram illustrating a downlink resource structure of an LTE system as one of the representative OFDM systems.

In the LTE downlink resource structure, a Resource Block consists of $N_{symbol}^{DL}$ consecutive OFDM symbols (equivalent to one slot) in the time domain and $N_{cs}^{RB}$ consecutive subcarriers in the frequency domain. As a consequence, one resource block consists of $N_{symbol}^{DL} \times N_{cs}^{RB}$ tones (the term "tone" is used in general although there is an equivalent term "resource element" for use in LTE), occupying 0.5 ms in the time domain and $N_{cs}^{RB} \times 150$ kHz in the frequency domain. $N_{symbol}^{DL}$ may be 7 or 6, and $N_{cs}^{RB}$ may be 12.

In FIG. 2, the resource block occupies 1 timeslot 200 comprised of the OFDM symbols identified by an index of l=0 ... $N_{symbol}^{DL}-1$. $N_{RB}^{DL}$ resource block consists of $N_{symbol}^{DL} \times N_{cs}^{RB}$ subcarriers 210 identified by an index of k=0 ... $N_{RB}^{DL} \times N_{cs}^{RB}-1$ in the frequency domain. The reference tone 220 and data channel tone 230 are mapped to predetermined positions in the LTE downlink resource structure.

In a wireless communication system, channel quality may be indicated by a Signal-to-Interference plus Noise Ratio (SINR). The SINR is calculated by dividing the received signal power P of a serving cell of a terminal by the sum of noises N and interference I caused by neighboring cells (P/(I+N). In the downlink communication of the OFDM cellular system, the base station is the transmitter and the terminals are receivers, and the received channel quality may be indicated by an SINR.

Typically, a receiver performs demodulation on the signals mapped to all data channel tones. This is because, if the reception channel qualities at the data channel tones are relatively even, the successful reception probability increases as the number of data channel tones used in demodulation increases. In a case that a reception channel quality at a specific tone is significantly low in comparison with that at other tones, however, the probability of successful reception is likely to be increased by excluding the tone at which the significantly low reception channel quality is predicted from the demodulation process.

Typically, the data channel is transmitted when there is information to transmit to a terminal, unlike the reference signal, which is always transmitted periodically. If real signals are transmitted using all of the data channel tones of neighboring cells, the terminal being served by the serving cell experiences relatively even interference across all of the tones; thus, the reception SINR also becomes even across all of the tones. In this case, it is advantageous for the terminal being served by the serving cell to perform demodulation on all of the data channel in terms of increasing the successful reception rate. In contrast, if the neighboring cells have no information to be transmitted to the terminals being served thereby and transmit only broadcast reference signals so that their data channel tones are empty, the SINR significantly drops only at the data channel tones of the serving cell terminal that are overlapped with the tones designated for the reference signals being transmitted by the neighboring cells, but the SINR is good at the tones overlapped with the empty tones of the neighboring cells in the frequency-time resource grid. In this case, it may be advantageous to perform demodulation at the tones remaining after excluding the tones with the degraded SINRs.

Figure 3:
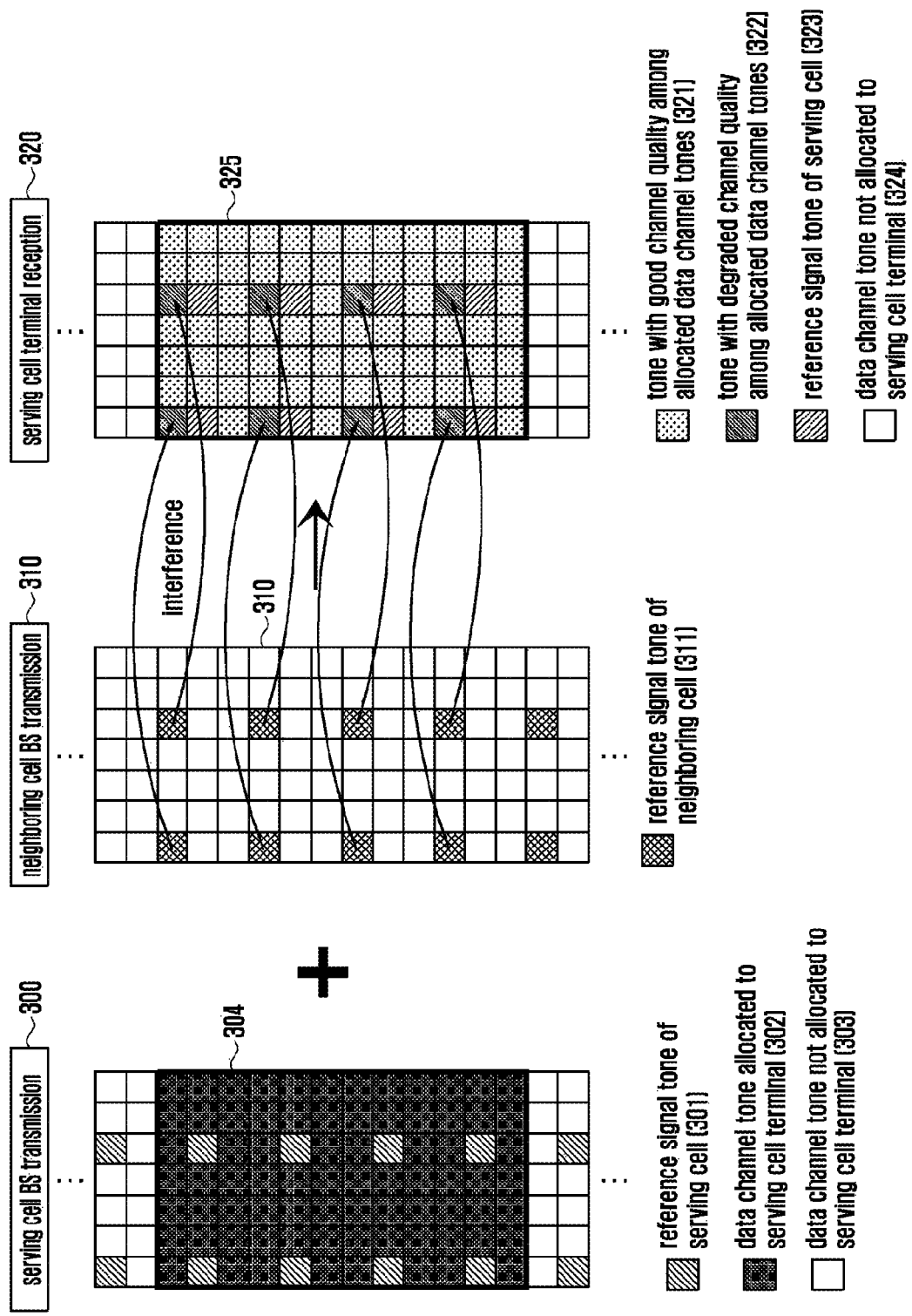
FIG. 3 is a diagram illustrating channel qualities at data channel tones being received by a terminal served by a serving cell under the assumption that neighboring cells transmit only reference signals.

FIG. 3 is a diagram illustrating channel qualities at data channel tones in view of the terminal being served by a serving cell under the assumption that neighboring cells transmit only reference signals. In FIG. 3, reference number 300 denotes a resource mapping pattern including reference signal tones 301 and the data channel tones 302 to which the data to be transmitted to the terminal is mapped in the OFDM resource 304 of the serving cell. Although the data channel tones 303 to which no data to be transmitted to the terminal is mapped are empty, it may be regarded that the reference signal is mapped to the empty frequency region. Reference number 310 denotes a resource mapping pattern for OFDM transmission in a neighboring cell. The neighboring cell has no information to transmit to the terminal being served thereby and thus transmits only the reference signal 311 while the data channel tones remain empty. In the resource mapping pattern 320 in view of the terminal being served by the serving cell, the OFDM resource 325 allocated to the terminal includes the reference signals 323 of the serving cell and data channel tones. The SINR is degraded at the data channel tones 322 overlapped in position with the reference signal tones of the neighboring cell, but the SINR is high at the data channel tones 321 overlapped in position with the data channel tones of the neighboring cell which are empty among the reception data channel tones of the terminal.

If it is possible for the terminal to estimate the reception channel quality per data channel tone accurately, it may be possible to increase the total successful reception probability in such a way that the terminal selectively applies one of the two demodulation schemes: performing demodulation on all of the data channel tones and performing demodulation on the data channel tones remaining after excluding the tones with degraded reception channel quality. However, typically it is difficult for the terminal to estimate accurate reception channel quality per tone and this means that the above described interference cancellation operation cannot be accomplished only with the terminal operation. The present invention aims to improve the successful reception probability in such a way that a base station provides the terminal with the information on the tones to be excluded in the demodulation process in order for the terminal to perform demodulation on the tones remaining after excluding the tones indicated by the information.

Hereinafter, a description is made in detail of the method for improving reception performance of a terminal in such a way that a base station provides the terminal with the information on the tones dominantly impacted by interference from neighboring cells in order for the terminal to demodulate the data channel after cancelling the interference from neighboring cells based on the information.

Figure 4:
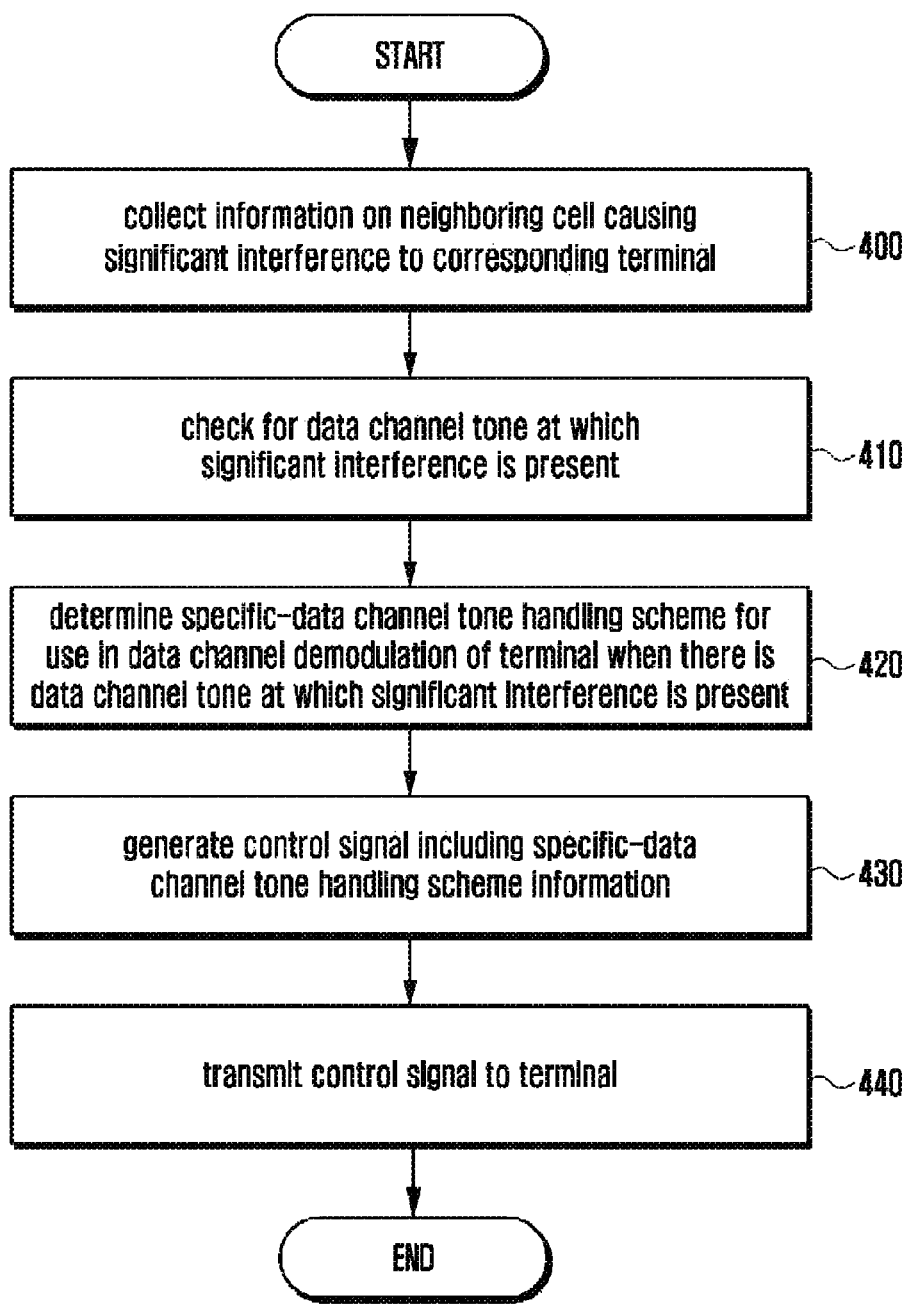
FIG. 4 is a flowchart illustrating a method for a base station to provide a terminal with information on the tones at which dominant neighboring cell interference is present.

FIG. 4 is a flowchart illustrating a method for a base station to provide a terminal with information on the tones at which dominant neighboring cell interference is present.

In reference to FIG. 4, the base station (or serving cell) collects information on the neighboring cells that dominantly cause interference to the terminal at step 400. If the interference amount from a few (one or two) of the neighboring cells is considerably higher than that from other cells, the base station may collect the information on the neighboring cells. The neighboring cell information may include neighboring cell identifiers such as Physical Cell Identifier (PCID), long-term valid information such as amount of interference from the neighboring cells to the corresponding terminal, and real-time changing information such as the information on whether the neighboring cells transmit data signals to other terminals located therein at the timepoint when the serving cell transmits a data signal to the corresponding terminal. If it is difficult to determine presence of data signal transmission from the neighboring cells to the other terminals located within the serving cell in real time, it may be possible to use the information on the statistically calculated load indicating frequency of transmission from the neighboring cells to the other terminals served by the neighboring cells. The base station may receive a measurement report (MR) from the terminal or the terminal-specific uplink signal measurement information measured at the neighboring cells through wired or wireless inter-cell connection links to collect the information on the interference amount and physical cell identifiers of the interferer cells. The base station may also collect the real-time changing information such as the information on whether the neighboring cells transmit data to terminals being served thereby within their coverage from the neighboring cells through wired or wireless inter-cell connection links or from a separate network entity managing data transmission of neighboring cells through a wired or wireless connection link established with the network entity.

At step 410, the base station checks for data channel tones at which significantly large neighboring cell interference is present based on the collected neighboring cell information, while the corresponding cells transmit data signals to corresponding terminals. If there is no data signal transmission from the neighboring cell, this means that the neighboring cells transmit only reference signals and interferences may occur only at the data channel tones being overlapped with the reference signal tones of the neighboring cells in the frequency-time resource grid.

If there is a data channel tone at which a large neighboring cell interference is present, at step 420, the base station determines a method for handling the data channel tone at which a large neighboring cell interference is present. If there is no data channel tone at which a large neighboring cell interference is present in comparison with other data channel tones, i.e., if the reception SINR is even at the data channel tone, the base station configures the corresponding terminal to perform demodulation on the data transmission at all of the data channel tomes. If there is any data channel tone at which a large neighboring cell interference is present in comparison with other data channel tones, i.e., if the reception SINR is degraded at a certain data channel tone, the base station configures the corresponding terminal to perform demodulation with one demodulation scheme, which is capable of increasing the successful reception probability, that is selected from a scheme for performing demodulation at the data channel tones remaining after excluding the corresponding data channel tone and a scheme for performing demodulation at the data channel tones including the corresponding data channel tone. It may also be possible to determine to apply to the data channel tones with the degraded SINR a weight lower than that of other data channel tones.

The base station generates a control signal including information on a specific-data channel tone handling scheme at step 430 (the specific data channel tone handling scheme information may be referred to as interference cancellation information). The base station may operate to include information on the position of the specific data channel tone at which significant neighboring cell interference is present in control signal along with the specific data tone handling scheme information. In the case that the control signal includes the information on the position of the specific data channel tone, the terminal may configure itself to exclude the specific data channel tone indicated by the received control signal in demodulating data channel tone. In the exemplary case of the LTE standard, the base station may transmit to the terminal the specific data tone handling scheme information or specific data channel tone position information by means of a Downlink Control Information (DCI) transmitted through Physical Downlink Control Channel (PDCCH) or an information element transmitted through a Radio Resource Control (RRC) layer signaling (which is interchangeably referred to as higher layer signaling).

The base station transmits the control signal to the terminal at step 440.

The information carried in the control signal transmitted by the base station may be changed according to the characteristics of the system. A description is made of the method for demodulating a data channel tone based on the information on the position at which the data channel tone of the serving cell and the Cell-specific Reference Signal (CRS) tone of a neighboring cell are overlapped in an LTE downlink transmission situation.

Figure 5A:
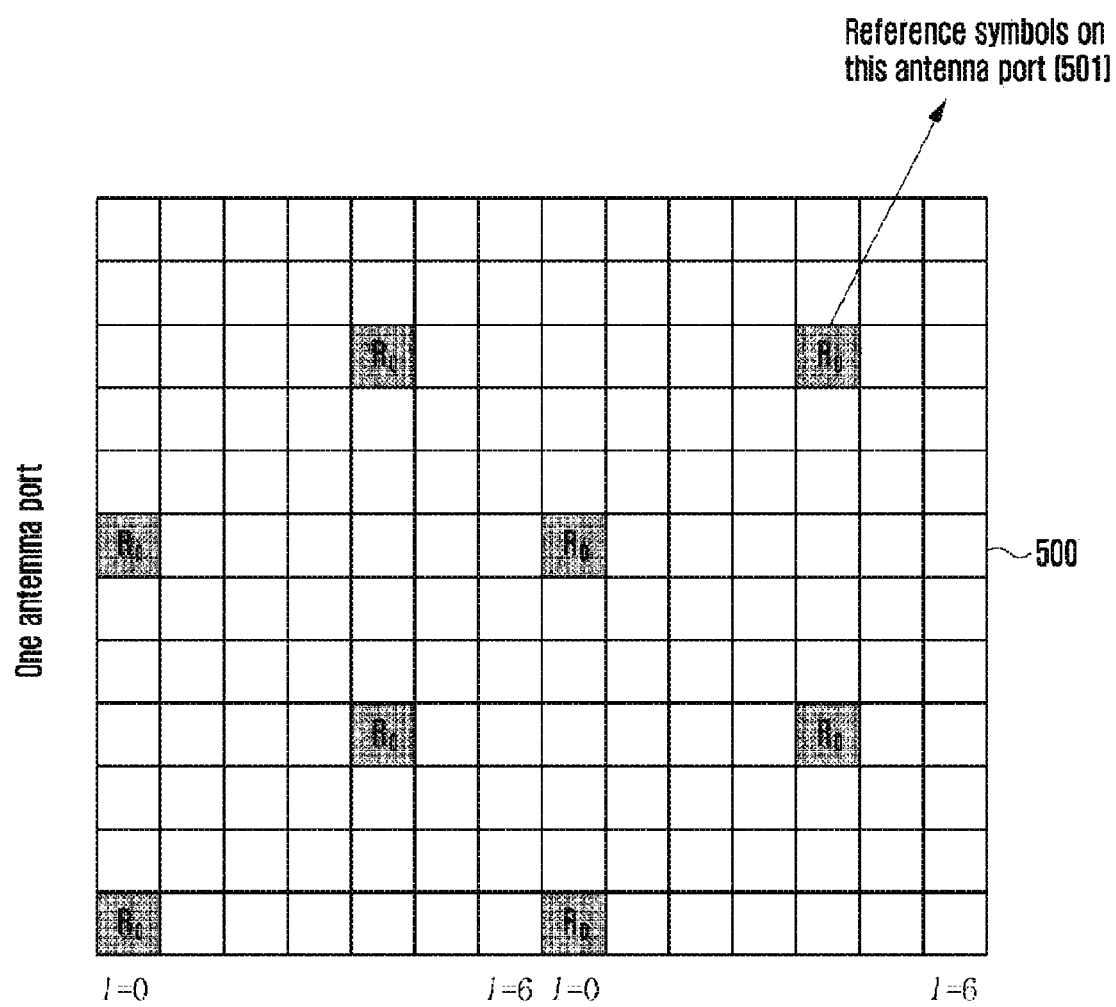
FIG. 5A is a diagram illustrating a CRS pattern in an exemplary case of using 1 CRS antenna in the LTE system.
Figure 5B:
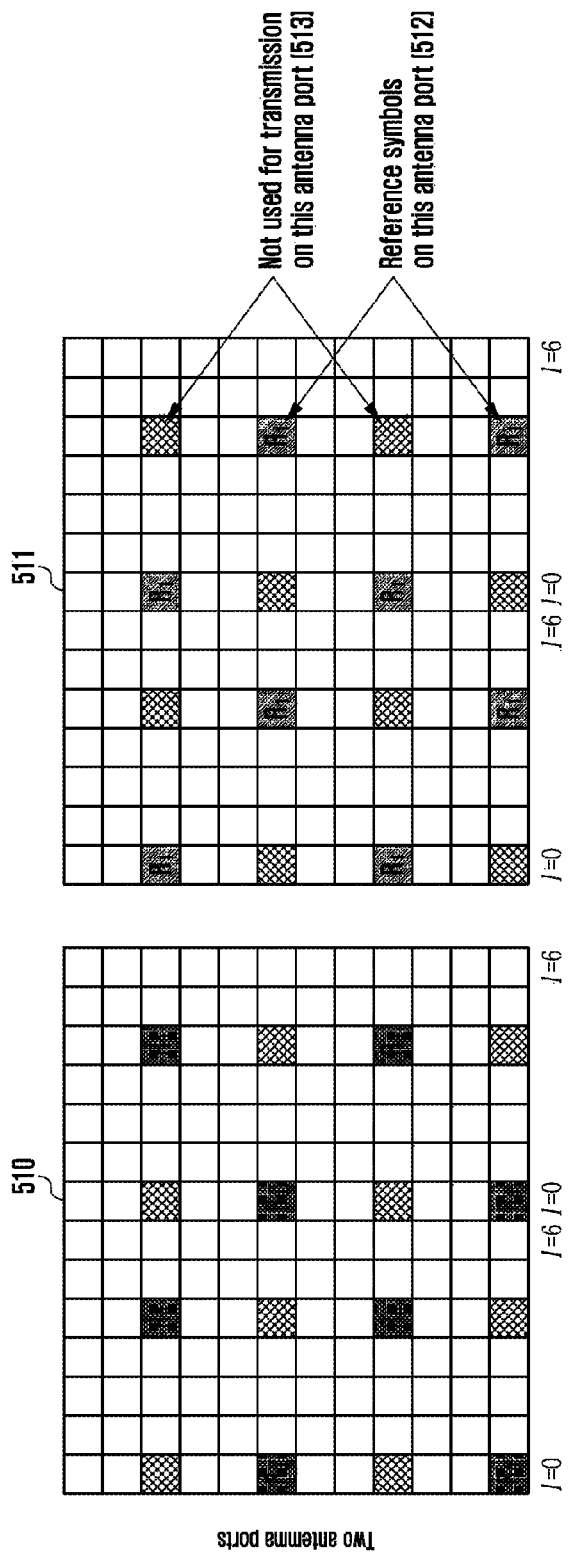
FIG. 5B is a diagram illustrating a CRS pattern in an exemplary case of using 2 CRS antennas in the LTE system.

FIG. 5 is a diagram illustrating positions of CRS in an LTE system. FIG. 5A is a diagram illustrating a CRS pattern in an exemplary case of using 1 CRS antenna, FIG. 5B is a diagram illustrating a CRS pattern in an exemplary case of using 2 CRS antennas, and FIG. 5C is a diagram illustrating a CRS pattern in an exemplary case of using 4 CRS antennas.

The CRS is mapped to a tone at a position of (k, l) where k and l are determined by equations 1 to 3. In the equations, p denotes an antenna port of 0 to 3.

$$k = 6m + (v + v_{shift}) \bmod 6 \quad \text{[Equation 1]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 2]}$$

$$v_{shift} = N_{ID}^{cell} \bmod 6 \quad \text{[Equation 3]}$$

One antenna port transmits no signal at its tone overlapped in position with the CRS tone of another antenna port.

In reference to FIG. 5A, the CRS 501 is mapped to a Resource Block pair 500 of antenna port 0. In reference to FIG. 5B, the CRS 512 is mapped to a Resource Block pair 510 of antenna port 0 and a Resource Block pair 511 of antenna port 1. The tone 513 overlapped in position with the CRS tone of antenna port 0 of the Resource Block pair of antenna port 1 in the frequency-time resource grid is not used. Likewise, the tone overlapped in position with the CRS tone of antenna port 1 of the Resource Block pair of antenna port 0 is not used. In reference to FIG. 5C, the CRS 524 is mapped to the Resource Block pair 520 of antenna port 0, the Resource Block pair 521 of antenna port 1, the Resource Block pair 522 of antenna port 2, and the Resource Block pair 523 of antenna port 3. As in FIG. 5B, the tone 525 overlapped in position with the CRS tone of one antenna port is not used by other antenna ports.

A description is made hereinafter of the method for generating information on the positions of tones at which significant interference caused by CRSs transmitted by neighboring cells is present, when inter-base station synchronization is achieved or not, in the LTE system.

First, a method is described for generating, when the inter-base station synchronization is achieved, the information on the positions of tones at which significant interference caused by neighboring cells is present. If the subframe time synchronization is achieved among the base stations, the time-axis positions of the CRS tones are identical, while the frequency-axis positions of the CRS tones are determined based on per-cell physical cell identifiers in reference to the above equations, as summarized in Table 1.

TABLE 1

| Number of antenna = 1 | Time-axis position | $(N_{DL}^{symb} - 3)^{th}$ OFDM symbol per slot |
|---|---|---|
| | Frequency-axis position | Subcarrier fulfilling $\bmod(k, 6) = \bmod(PCID, 6)$ at $0^{th}$ OFDM symbol Subcarrier fulfilling $\bmod(k, 6) = \bmod(PCID + 3, 6)$ at $(N_{DL}^{symb} - 3)^{th}$ OFDM symbol |
| Number of antenna = 2 | Time-axis position | $(N_{DL}^{symb} - 3)^{th}$ OFDM symbol per slot |
| | Frequency-axis position | Subcarrier fulfilling $\bmod(k, 3) = \bmod(PCID, 3)$ |
| Number of antenna = 3 | Time-axis position | $(N_{DL}^{symb} - 3)^{th}$ OFDM symbol per slot |
| | Frequency-axis position | Subcarrier fulfilling $\bmod(k, 3) = \bmod(PCID, 3)$ |

The terminal may identify the time-axis positions of the CRSs of the neighboring cells at the same time-axis positions of CRSs of its serving cell because inter-base station time synchronization has been achieved. Accordingly, the base station notifies the terminal of the frequency-axis positions of the CRSs of the neighboring cells, and the terminal is capable of locating the positions of the CRSs of the neighboring cells. If the terminal identifies the CRS positions of the neighboring cells based on the control information transmitted by the base station, it may be possible to determine to exclude the data channel tones of the serving cell that is overlapped with the CRS tones of the neighboring cells in the frequency-time resource grid from demodulation.

In the case that the number of CRS antenna ports of the serving base station (or serving cell) is 1, 5 bits are sufficient to indicate whether to exclude the subcarrier positions where the CRSs of the neighboring cells, with the exception of the CRS of the serving cell, are mapped from demodulation in the control signal. The number of neighboring cells may be one or more. That is, assuming that the index k of the CRS subcarrier of the serving cell fulfils the condition of $\bmod(PCID_{serving}, 6) = \bmod(k, 6)$ (here $PCID_{serving}$ denotes the physical cell identifier of the serving cell), the subcarrier positions corresponding to five cases where index k of the subcarrier, with the exception of the CRS subcarriers of the serving cells, fulfils mod($PCID_{sercving}$+1,6)=mod(k,6) mod ($PCID_{sercving}$+2,6)=mod(k,6), mod($PCID_{sercving}$+3,6)= mod(k,6), mod($PCID_{sercving}$+4,6)=mod(k,6), and mod($PCID_{sercving}$+5,6)=mod(k,6), respectively, may be configured into the 5-bit information.

Figure 6A:
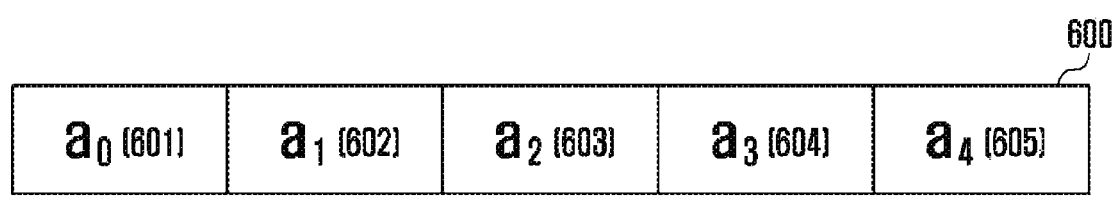
FIG. 6A is a diagram illustrating an exemplary control signal format for the case where the number of CRS antenna ports of the serving base station is 1.

FIG. 6A is a diagram illustrating an exemplary control signal format for the case where the number of CRS antenna ports of the serving base station (or serving cell) is 1. The control signal 600 consists of 5 information bits of a0, a1, a2, a3, and a4 each indicating whether to exclude the corresponding subcarrier from demodulation of a terminal. The information bits a0 601, a1 602, a2 603, a3 604, and a4 605 correspond to the cases where the subcarrier index k fulfils mod($PCID_{sercving}$+1,6)=mod(k,6), mod($PCID_{sercving}$+2,6)= mod(k,6), mod($PCID_{sercving}$+3,6)=mod(k,6), mod($PCID_{sercving}$+4,6)=mod(k,6), and mod($PCID_{sercving}$+5,6)=mod(k,6), respectively. The terminal excludes the subcarrier position corresponding to the information bit set to 1 from demodulation and includes the subcarrier position corresponding to the information bit set to 0 in demodulation. Vice-versa is possible too.

In the case that the number of CRS antenna ports of the serving base station (or serving cell) is 2 or 4, 2 bits are sufficient to indicate whether to exclude the subcarrier positions to which the CRSs of the neighboring cells may be mapped, with the exception of the CRS of the serving cell, from demodulation. That is, the number of neighboring cells may be more than one. That is, assuming that the index k of the CRS subcarrier of the serving cell fulfils the conditions of mod($PCID_{sercving}$,3)=mod(k,3) (here $PCID_{sercving}$ denotes the physical cell identifier of the serving cell), the subcarrier positions corresponding to two cases where index k of the subcarrier, with the exception of the CRS subcarriers of the serving cells, fulfils mod($PCID_{sercving}$+1,3)=mod(k,3) and mod($PCID_{sercving}$+2,3)=mod(k,3), respectively, may be configured into the 2-bit information.

Figure 6B:
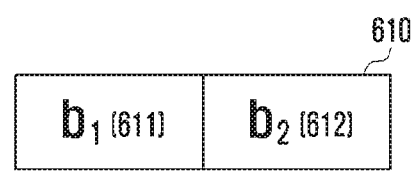
FIG. 6B is a diagram illustrating an exemplary control signal format available for the case where the number of CRS antenna ports of the serving base station is 2 or 4.

FIG. 6B is a diagram illustrating an exemplary control signal format available for the case where the number of CRS antenna ports of the serving base station (or serving cell) is 2 or 4. The control signal 610 consists of 2 information bits b0 and b1 each indicating whether to exclude the corresponding subcarrier from demodulation. The information bit b0 611 corresponds to the case where the subcarrier index k fulfils mod($PCID_{sercving}$+1,3)=mod(k,3), and the information bit b1 612 corresponds to the case where the subcarrier index k fulfils mod($PCID_{sercving}$+2,3)=mod(k,3). Each information bit is set to 1 for indicating exclusion of the corresponding subcarrier position from demodulation and to 0 for indicating inclusion of the corresponding subcarrier position in demodulation. Vice-versa is possible too.

The control information may be delivered to the terminal by adding 5 or 2 extra bits to the DCI of the legacy PDCCH or replacing legacy control information in the DCI. In the case that the control information is 2 bits, the base station may replace any legacy information of the precoding information field (2, 3, or 6 bits) of the DCI format 2 with the 2-bit control information. In this case, it may be possible for the base station and the terminal to agree to use a fixed value of a codebook index for precoding. It may also be possible to preconfigure to replace another information field of the DCI format with the control information. In the case that the control information is 5 bits, the base station may add the 5-bit control information to the end of the DCI format. In this case, the terminal may exclude the data channel tones indicated by the control information from demodulating data scheduled by the DCI including the control information.

Second, a method is considered for generating, when the inter-base station synchronization is not achieved, the information on the positions of the tones at which significant interference caused by neighboring cells is present.

In this case, the CRS positions of the neighboring cells differ from each other on the time axis, and one base station does not know the CRS positions of other base stations; thus, it is impossible to notify the terminal of the CRS tone positions of the neighboring cells, unlike the case where the inter-base station time synchronization is achieved. In this case, it is possible for the base station to notify the terminal of the PCID of the neighboring cell causing significant interference to the terminal such that the terminal acquires time synchronization with the corresponding neighboring cell and determines the data channel tones of its serving cell that is overlapped in position with the CRS tones of the neighboring cell in the frequency-time resource grid.

In the exemplary case of the LTE standard having the PCID range of 0 to 503, 9 information bits are necessary for the base station to notify the terminal of the PCID of one neighboring cell. Accordingly, it is not preferable to include entire PCIDs in the DCI in view of control information overhead. Accordingly, the base station notifies, in advance, the terminal of the PCIDS of N neighboring cells causing dominant interference to the terminal being served thereby as relatively long-term durable information through higher layer signaling and transmits to the terminal the DCI including N-bit control information indicating the interferer cells among the N neighboring cells. The terminal may determine whether to exclude the data channel tones of the serving cell that are each overlapped in position with particular CRS tones of N neighboring cells in the frequency-time resource grid from demodulation in real time based on the N-bit information.

Figure 7:
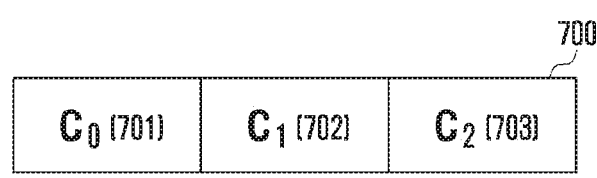
FIG. 7 is a diagram illustrating a format of N-bit control information being included in DCI transmitted to a terminal in a situation where inter-base station time synchronization is achieved.

FIG. 7 is a diagram illustrating a format of N-bit control information being included in DCI transmitted to a terminal in a situation where inter-base station time synchronization is not achieved. Assuming N=3, the N-bit control information 700 consists of information bits: c0 701, c1 702, and c2 703. Here, the informations bits correspond to neighboring cells 0, 1, and 2, respectively. The serving base station measures the signal strengths of the respective neighboring cells to determine the neighboring cell causing significant interference to the signal destined for the terminal and transmits to the terminal the DCI including the control information indicating the neighboring cell determined as a target to be excluded from demodulation. The terminal excludes the CRS positions of the neighboring cell of which the corresponding information bit in the control information is set to 1 from data channel demodulation and includes the CRS positions of the neighboring cell of which the corresponding information bit in the control information is set to 0 in data channel demodulation. Vice-versa is possible too.

Figure 8:
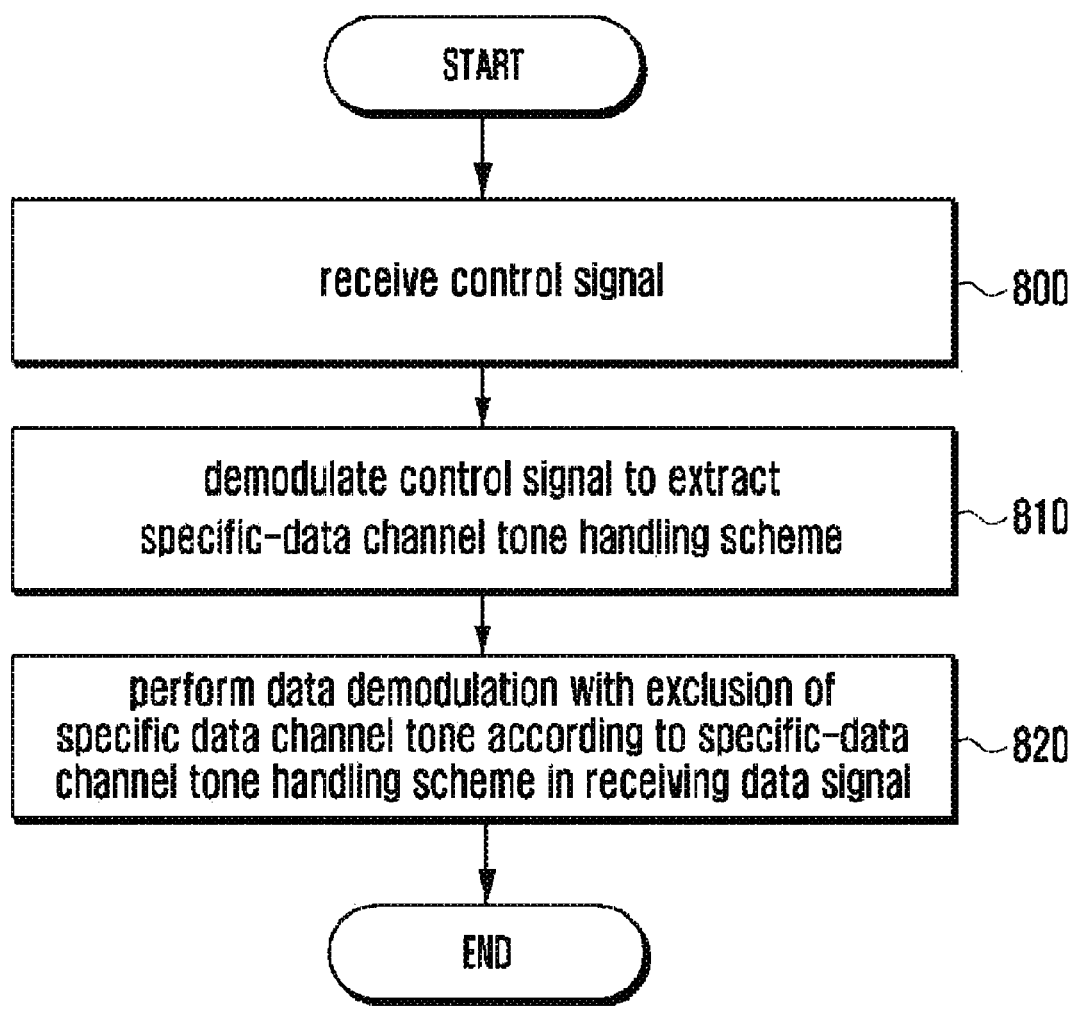
FIG. 8 is a flowchart illustrating a method for a terminal to perform data demodulation based on the information about the tones at which significant interference caused by neighboring cells is present, the information being transmitted by a base station.

FIG. 8 is a flowchart illustrating a method for a terminal to perform data demodulation based on the information about the tones at which significant interference caused by neighboring cells is present, the information being transmitted by a base station.

In FIG. 8, the terminal receives a control signal at step 800.

The terminal demodulates the control signal, at step 810, to extract information on a specific-data channel tone handling scheme for handing the data channel tones at which significant interference caused by neighboring cells is present and positions of the specific data channel tones. It may be possible to preconfigure the terminal to exclude the data channel tones corresponding to the extracted positions from demodulation. In the exemplary case of the LTE standard, the terminal may extract the specific-data channel tone handling scheme or positions of the specific data channel tones from the DCI transmitted through the PDCCH or an information element transmitted through RRC layer signaling (which is interchangeably referred to as higher layer signaling).

At step 820, the terminal performs demodulation with the exclusion or inclusion of the specific data channel tones based on the information on the specific-data channel tone handling scheme and positions of the specific data channel tones. It may also be possible to apply to the specific data channel tones a weight lower than that of other data channel tones to include the specific data channel tones in data demodulation.

Figure 9:
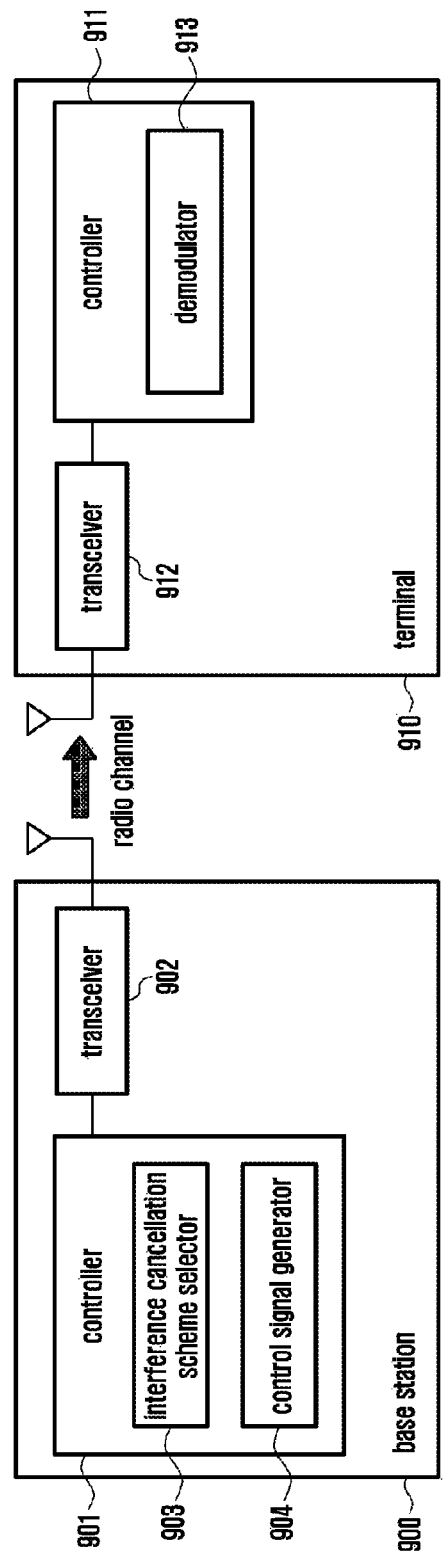
FIG. 9 is a block diagram illustrating configurations of devices capable of performing the operations of the present invention.

FIG. 9 is a block diagram illustrating configurations of devices capable of performing the operations of the present invention.

In reference to FIG. 9, the devices capable of performing the operations of the present invention include a base station 900 and a terminal 910. The base station 900 includes a controller 901 and a transceiver 902. The controller 901 controls the base station 900 to collect information on the neighboring cells causing significant interference to the terminal 910 served thereby; to determine, when transmitting data signals to the terminal 910 in the corresponding cell based on the collected information, whether there is any data channel tone at which the significant interference from the neighboring cells is present; to select, when there is any data channel tone at which the significant interference from the neighboring cells is present, a specific-data channel tone handling scheme; and to generate a control signal including the information on specific-channel tone handling scheme. The specific-data channel tone handling scheme may be selected by an interference control scheme selector 903 or the controller 901. The control signal may be generated by a control signal generator 904 or the controller 901. The transceiver 902 takes charge of communicating signals with the terminal 910.

The terminal 910 includes a controller 911 and a transceiver 912. The controller 911 controls the terminal 910 to receive the control signal, to demodulate the control signal to extract the information on the specific-data channel tone handling scheme and positions of the specific data channel tones at which significant interference caused by neighboring cells is present, and to demodulate data with exclusion or inclusion of the specific data channel tones based on the specific-data channel tone handling scheme and positions of the specific data channel tones. The data demodulation with the exclusion or inclusion of the specific data channel tones based on the specific-data channel tone handling scheme and positions of the specific data channel tones may be performed by a demodulator 913 or the controller 911. The transceiver 912 takes charge of communicating signals with the base station 900.

It is to be appreciated that those skilled in the art can change or modify the embodiments without departing from the technical concept of this invention. Accordingly, it should be understood that the above-described embodiments are essentially for an illustrative purpose only and not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method for transmitting interference cancellation information from a base station to a terminal in an Orthogonal Frequency Division Multiplexing (OFDM) wireless communication system, the method comprising:
    identifying, by the base station, information on a neighboring cell causing an interference equal to or greater than a predetermined threshold to the terminal;
    determining a specific-data channel tone handling scheme for specific-data channel tones, the specific-data channel tone handling scheme being one of an exclusion of the specific-data channel tones from data demodulation or an inclusion of the specific-data channel tones with lower weight than other data channel tones to the data demodulation;
    generating the interference cancellation information including the specific-data channel tone handling scheme and information on positions of the specific-data channel tones for use in the data demodulation of the terminal based on the neighboring cell information; and
    transmitting the interference cancellation information to the terminal.

2. The method of claim 1, wherein the neighboring cell information comprises at least one of a physical cell identifier of the neighboring cell, amount of the interference caused by the neighboring cell, information on presence or absence of a data signal from the neighboring cell to a terminal being served by the neighboring cell while the base station transmits data signals to the terminal, and a frequency of data transmission from the neighboring cell to the terminal being served by the neighboring cell.

3. The method of claim 1, wherein the specific data channel tones are data channel tones overlapped in position with cell-specific reference signal tones of the neighboring cell.

4. The method of claim 3, wherein the interference cancellation information includes 2 bit or 5-bit information indicating positions of the cell-specific reference signal tones of the neighboring cell.

5. A method for a terminal to demodulate a data channel based on interference cancellation information received from a base station in an Orthogonal Frequency Division Multiplexing (OFDM) wireless communication system, the method comprising:
    receiving the interference cancellation information including a specific-data channel tone handling scheme and information on positions of specific-data channel tones, the interference cancellation information being generated based on information on a neighboring cell causing an interference equal to or greater than a predetermined threshold to the terminal for use in data demodulation of the terminal;
    receiving data on data channel tones from the base station; and
    demodulating the data channel based on the interference cancellation information,
    wherein the specific-data channel tone handling scheme is one of an exclusion of the specific-data channel tones from the data demodulation or an inclusion of the specific-data channel tones with lower weight than other data channel tones to the data demodulation.

6. The method of claim 5, wherein the neighboring cell information comprises at least one of a physical cell identifier of the neighboring cell, amount of the interference caused by the neighboring cell, information on presence or absence of a data signal from the neighboring cell to a terminal being served by the neighboring cell while the base station transmits data signals to the terminal, and a frequency of data transmission from the neighboring cell to the terminal being served by the neighboring cell.

7. The method of claim 5, wherein demodulating the data channel comprises excluding the specific data channel tones from the data demodulation among the data channel tones.

8. The method of claim 5, wherein the specific data channel tones are data channel tones overlapped in position with cell-specific reference signal tones of the neighboring cell.

9. The method of claim 8, wherein the interference cancellation information includes 2-bit or 5-bit information indicating positions of the cell-specific reference signal tones of the neighboring cell.

10. A base station for transmitting interference cancellation information to a terminal in an Orthogonal Frequency Division Multiplexing (OFDM) wireless communication system, the base station comprising:
a transceiver to transmit and receive signals; and
a controller configured to control to identify information on a neighboring cell causing an interference equal to or greater than a predetermined threshold to the terminal, determine a specific-data channel tone handling scheme for specific-data channel tones, the specific-data channel tone handling scheme being one of an exclusion of the specific-data channel tones from data demodulation or an inclusion of the specific-data channel tones with lower weight than other data channel tones to the data demodulation, generate the interference cancellation information including the specific-data channel tone handling scheme and information on positions of the specific-data channel tones for use in the data demodulation of the terminal based on the neighboring cell information, and transmit the interference cancellation information to the terminal.

11. The base station of claim 10, wherein the neighboring cell information comprises at least one of a physical cell identifier of the neighboring cell, amount of the interference caused by the neighboring cell, information on presence or absence of a data signal from the neighboring cell to a terminal being served by the neighboring cell while the base station transmits data signals to the terminal, and a frequency of data transmission from the neighboring cell to the terminal being served by the neighboring cell.

12. The base station of claim 10, wherein the specific data channel tones are data channel tones overlapped in position with cell-specific reference signal tones of the neighboring cell.

13. The base station of claim 12, wherein the interference cancellation information includes 2 bit or 5-bit information indicating positions of the cell-specific reference signal tones of the neighboring cell.

14. A terminal for demodulating a data channel based on interference cancellation information received from a base station in an Orthogonal Frequency Division Multiplexing (OFDM) wireless communication system, the terminal comprising:
a transceiver to transmit and receive; and
a controller configured to control to receive the interference cancellation information including a specific-data channel tone handling scheme and information on positions of specific-data channel tones, the interference cancellation information being generated based on information on a neighboring cell causing an interference equal to or greater than a predetermined threshold to the terminal for use in data demodulation of the terminal, receive data on data channel tones from the base station, and demodulate the data based on the interference cancellation information,
wherein the specific-data channel tone handling scheme is one of an exclusion of the specific-data channel tones from the data demodulation or an inclusion of the specific-data channel tones with lower weight than other data channel tones to the data demodulation.

15. The terminal of claim 14, wherein the neighboring cell information comprises at least one of a physical cell identifier of the neighboring cell, amount of the interference caused by the neighboring cell, information on presence or absence of a data signal from the neighboring cell to a terminal being served by the neighboring cell while the base station transmits data signals to the terminal, and a frequency of data transmission from the neighboring cell to the terminal being served by the neighboring cell.

16. The terminal of claim 14, wherein the controller is further configured to control to exclude the specific data channel tones from the data demodulation among the data channel tones.

17. The terminal of claim 14, wherein the specific data channel tones are data channel tones overlapped in position with cell-specific reference signal tones of the neighboring cell.

18. The terminal of claim 17, wherein the interference cancellation information includes 2 bit or 5-bit information indicating positions of the cell-specific reference signal tones of the neighboring cell.

* * * * *